United States Patent [19]

Anthony

[11] Patent Number: 4,923,146
[45] Date of Patent: May 8, 1990

[54] COOLING SYSTEM FOR SURFACES OF HIGH SPEED OPERATING FLIGHT CRAFT

[75] Inventor: Frank M. Anthony, Kenmore, N.Y.
[73] Assignee: Textron Inc., Providence, R.I.
[21] Appl. No.: 217,438
[22] Filed: Jul. 11, 1988
[51] Int. Cl.$^5$ .............................................. B64C 1/38
[52] U.S. Cl. .......................... 244/117 A; 244/117 R; 244/121; 244/126; 244/119; 244/158 A
[58] Field of Search .............. 244/117 R, 117 A, 121, 244/126, 119, 158 A; 165/169, 908

[56] References Cited

U.S. PATENT DOCUMENTS

| | | | |
|---|---|---|---|
| 3,013,641 | 12/1961 | Compton | 165/169 |
| 3,089,318 | 5/1963 | Hebeler | 244/117 A |
| 3,126,718 | 3/1964 | Flamand | 244/121 |
| 4,786,015 | 11/1988 | Niggemann | 244/117 A |

FOREIGN PATENT DOCUMENTS 839647 6/1960 United Kingdom .......... 244/117 A

*Primary Examiner*—Sherman D. Basinger
*Assistant Examiner*—Anne Sartelle
*Attorney, Agent, or Firm*—Bean, Kauffman & Spencer

[57] ABSTRACT

An improved means for convection cooling the skin surfaces of an atmospheric flight craft such as are subject to air friction-induced overheating when the craft operates at high speed, featuring employment of multiple layered, spaced apart skin members separated and relatively braced by web and post members. Fresh coolant fluid is simultaneously flushed against and contiguously covers a multiplicity of relatively small patches of the inside surface of the outer skin member to be protected, and the spent coolant from each patch is separately removed therefrom and returned to the craft's refrigeration facility. The web and post members also act to direct the pattern of coolant flow so as to provide a much improved heat transfer coefficient than can be attained by other coolant path configurations when an equal pressure drop is applied.

13 Claims, 3 Drawing Sheets

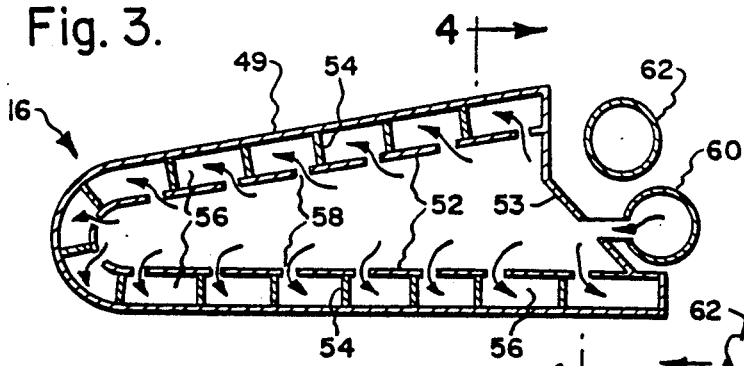
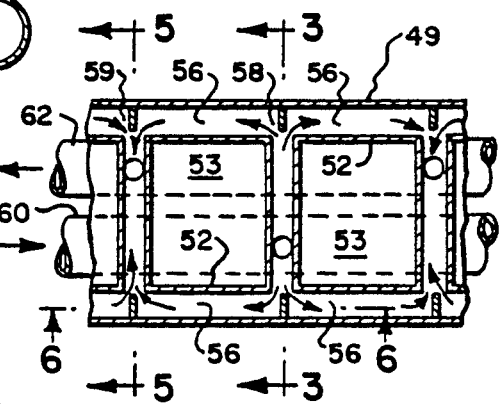
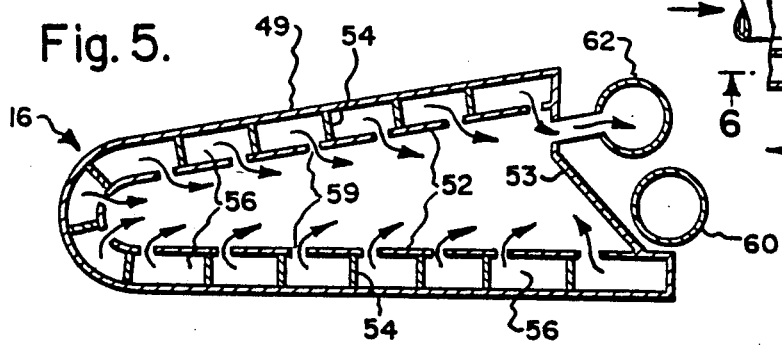
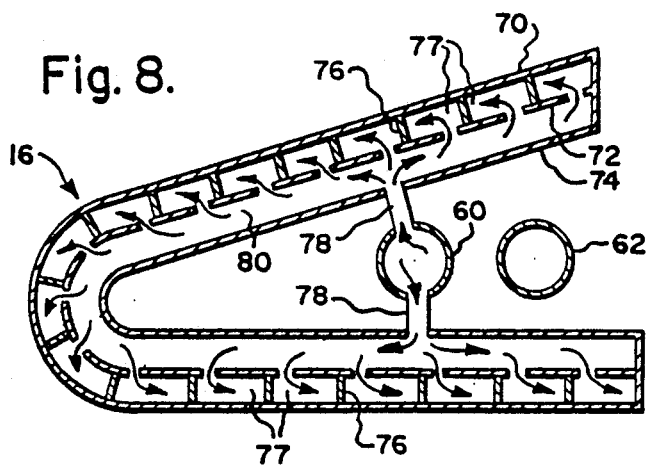
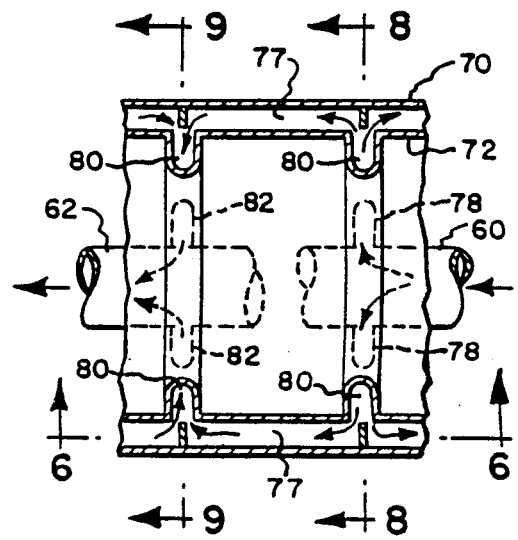
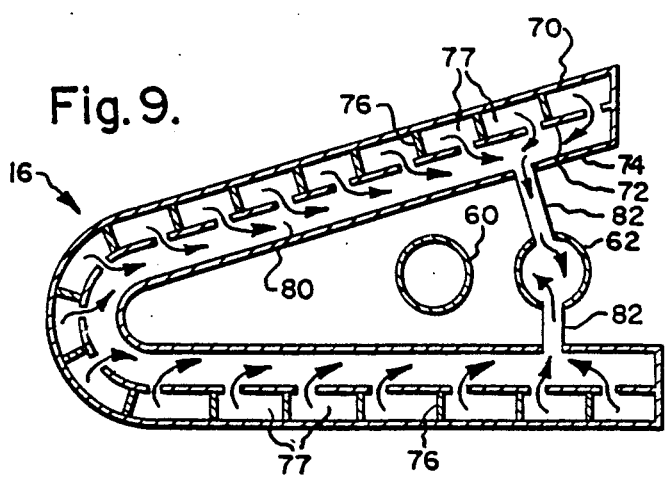

COOLING SYSTEM FOR SURFACES OF HIGH SPEED OPERATING FLIGHT CRAFT

BACKGROUND AND OBJECTS OF THE INVENTION

This invention relates to spacecraft and aerospace vehicles such as operate on occasion for example at hypersonic speeds in atmospheric environments and are thereby subject to overheating air friction-induced intolerable high temperatures, such as for example when a space ship reenters the earth's atmosphere, or the like. It is the object of the present invention to provide an improved facility for cooling the air friction-induced overheated surfaces of such craft so as to maintain their structural integrities and functional efficiencies; as well as to minimize the intensities of their air friction generated heat signatures.

Numerous proposals have previously been made and tried with a view to advancing this art, such as are disclosed for example in U.S. Pat. Nos. 2,922,291; 3,369,782; 3,731,893; 4,014,485 and 4,739,951. Thus, it is known that the practicalities of employing for this purpose coolant convection and evaporation techniques as well as ablation of heat absorbing tiles or the like have been previously explored. However, the present invention relates to and provides important improvements in systems employing convection heat transfer techniques.

BRIEF SUMMARY OF THE INVENTION

The present invention features provision of a multiplicity of small, separate, compartments which cover the inside wall portions of the outer skin surfaces of a multiple skin type craft structure which are subject to overheating as above described. A cooling fluid is circulated through each compartment separately by means of inlet and outlet manifolds. Thus, the coolant flows only in short length paths against the back surface of the outermost skin member of the craft's structure, thereby allowing for a much higher heat transfer coefficient than can be achieved by other coolant path configurations when an equal pressure drop is applied to the coolant.

Partitioning web members separating the individual compartments also serve as internal support parts of the composite skin structure, whereby to approximate the stiffness of a honeycomb type construction. The internal web supports function not only to accommodate the external loadings but also function as heat exchange devices providing for a still higher efficiency of heat removal. A variety of supplemental support means, coolant flow turbulent pattern guide means, inlet/outlet plenum constructions, and inlet/outlet manifolding arrangements are disclosed.

BRIEF DESCRIPTION OF THE DRAWINGS

Preferred embodiments of the invention are illustrated by the accompanying drawings wherein:

FIG. 3 is a fragmentary vertical sectional view taken as along line 3—3 of FIGS. 1 and 4 through the coolant inlet manifold and the heat exchange chambers behind the outer skin of a dual skin air foil construction embodying features of the invention;

FIG. 4 is a sectional view taken as along line 4—4 of FIG. 3;

FIG. 5 is a sectional view corresponding to FIG. 3 but is taken along lines 5—5 of FIGS. 1 and 4 showing the paths of spent coolant as it exits from the heat exchange chambers for return to the coolant regenerative system;

FIG. 7 is a sectional view corresponding to FIG. 4 but illustrates embodiment of features of the invention in an air foil of another form of multiple skin type construction;

FIGS. 8 and 9 are sectional views taken as along lines 8—8 and 9—9, respectively, of FIG. 7;

DESCRIPTION OF PREFERRED EMBODIMENTS

Figure 1:
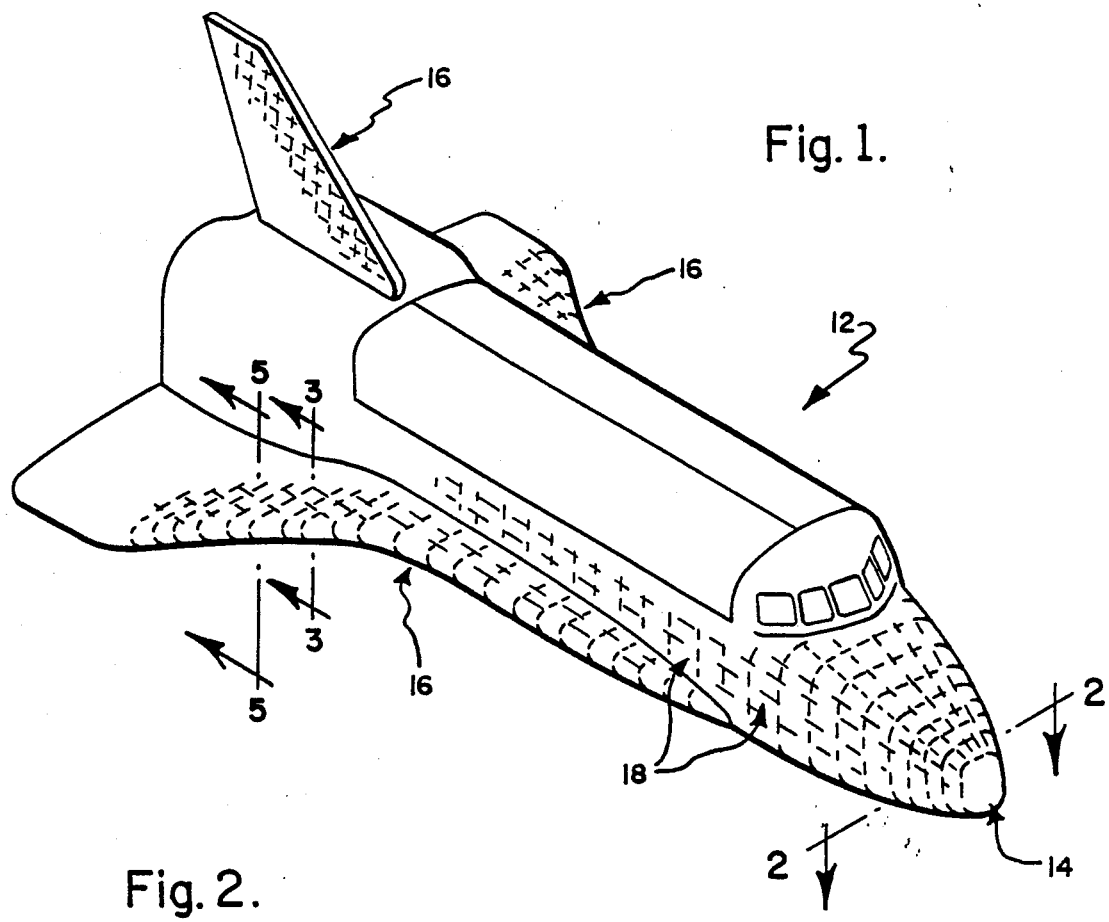
FIG. 1 is a top perspective view of a spaceship such as may beneficially embody nose cap, air foil, and panel cooling systems of the present invention.
Figure 2:
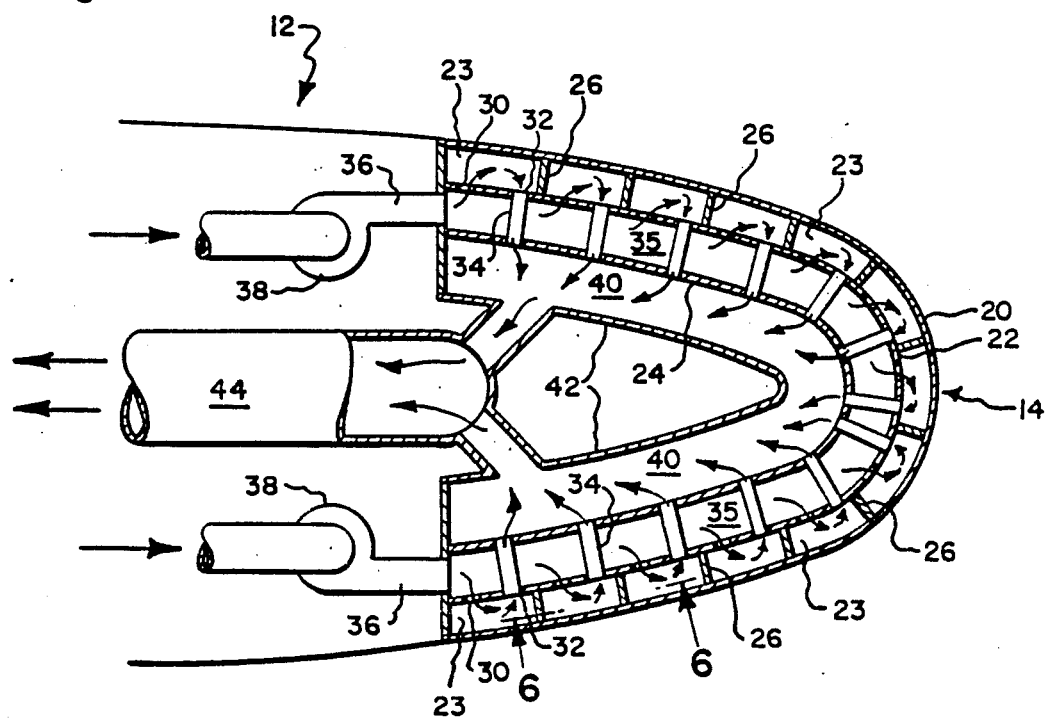
FIG. 2 is an enlarged scale fragmentary horizontal sectional view taken as along line 2—2 of FIG. 1 and showing therein embodiment of one form of multiple skin nose cap construction of the invention.

As shown by way of one example, at FIGS. 1 and 2 of the drawing herewith the invention may be beneficially embodied in a spacecraft such as is designated generally by the numeral 12 having cooling systems of the invention incorporated in the nose cap portion 14; the air foil components 16; and the panel components 18. FIG. 2 is a fragmentary sectional view taken as shown at line 2—2 of FIG. 1, and shows details of the nose cap construction comprising an outer skin 20 which is backed up by a separator skin 22, and support webs 26, which extend between facing surfaces of the skins to complete a rigidized honeycomb-like dual skin structure. The webs 26 also function to separate the space between the skins 20 and 22 into relatively small individual compartments which are in this case in the form of bucket-like compartments 23; and the skin portion 22 of each compartment 23 is provided with coolant inlet and outlet apertures 30 and 32, respectively. The skin 22 in turn is backed up by a skin 24 which is relatively braced thereto by means of coolant conducting conduits 34, thereby providing a coolant inlet manifold 35.

A coolant supply conduit 36 leads into the space 35 between skins 22 and 24, and may be aided such as by a pump 38 to supply coolant under pressure into the compartments 23 between the outer skin 20 and skin 22 by way of the apertures 30. Thus, the coolant is washed against the inner surfaces of the outer skin 20, and the spent coolant is then conveyed through the outlet apertures 32 and conduits 34 into the manifold chamber 40 which is formed by an inner skin 42 and the skin 24. The manifold 40 leads the spent coolant into an outlet conduit 44 which returns it to a refrigerant type heat exchanger or other cooling system carried within the body of the spacecraft, such as is well known in the art as is disclosed for example in earlier U.S. Pat. No. 3,929,305.

As discussed in detail in the above referenced patent, suitable materials and methods of fabricating the structures embodying the invention are readily available and well known in the art; their selections being dependent upon specifics such as temperature differentials to be encountered and the nature of the liquid or gaseous coolant fluid to be used. The heat exchange compartments 23 are pocket-shaped and may be formed on the back or inner side of the outer skin member 20 by machining or by fastening together separated fabricated parts supplemented by sealants. Or, they may be formed by the well known Electro-Discharge-Machine process sometimes referred to as the EDM process, or any other suitable process; such as by a chemical milling process or the like.

Figure 6:
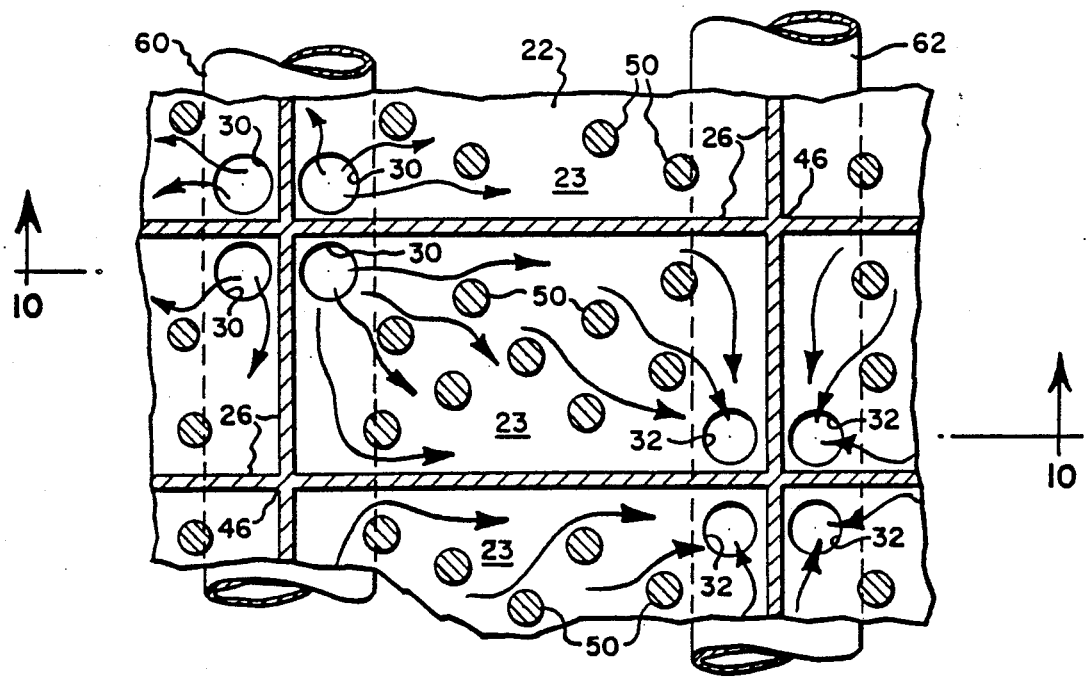
FIG. 6 is a fragmentary enlarged scale sectional view taken as along lines 6—6 of FIGS. 2, 4 and 7, showing how the skin support webs and pins guide the flow of coolant through the heat exchange compartments behind the outer skin.
Figures 10, 12:
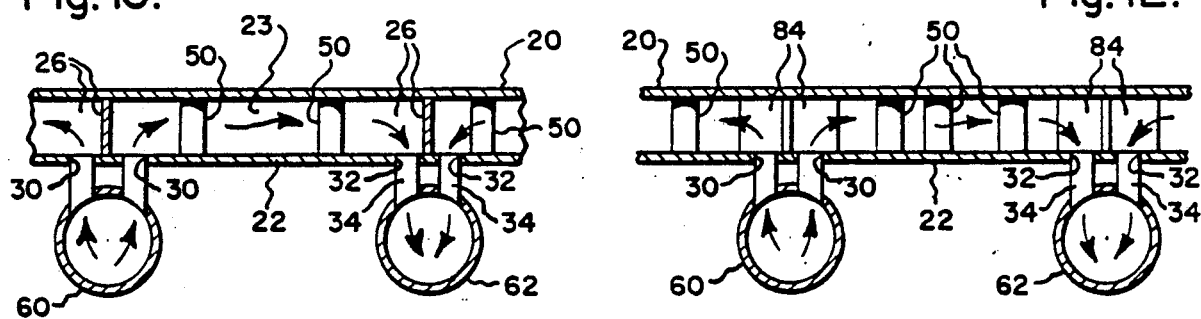
FIG. 10 is a fragmentary sectional view taken as along lines 10—10 of FIG. 6 showing how the structural components thereof relate.
FIG. 12 is a view taken as along lines 12—12 of FIG. 11.

As shown by way of example at FIG. 6, the compartments 23 are of square box-like configurations separated by the thin walled webs 26 thereby providing a plan view configuration wherein the transversely running webs 26 intersect at cross points 46. In this case, the inflowing coolant enters each aperture 30 so as to deliver coolant into corner portions of each compartment 23. The coolant thereupon flows in heat exchange scrubbing relation against the back surface of the outer skin 20 towards the opposite corner of the compartment, wherefrom it escapes through an aperture 32 of the skin 22. From thence the heated coolant flows through the conduits 34 into the spent coolant conduit 44.

Combination baffle and support posts as illustrated at 50 are positioned interiorly of each cooling compartment 23; the posts being either separately fabricated or formed integrally with either the skin 20 or the skin 22. Thus, the posts 50 are adapted to function both as internal stress resistant reinforcements for the relatively thin skin members, and as coolant flow directing baffle devices whereby the coolant fluid entering at one corner of the compartment is prevented from simply flowing directly diagonally across to the outlet port of that compartment, but is forced to divide and flow around the posts so as to set up an improved heat exchange flow pattern within each compartment.

As mentioned hereinabove, the structural components of the device as illustrated and described hereinabove may be separately fabricated by any preferred shop practices, and subsequently assembled into functionally integrated form by any preferred method. For example, in order to attain maximum structural and leakproof integrity and optimum thermal conductivity performance, the system may be diffusion-bonded, or brazed, or otherwise welded so that the components thereof are firmly locked together in proper registry so as to attain the fluid flow passage system described hereinabove. Or, it may be suitable to functionally integrate some or all of the parts of the structure by adhesive means.

FIGS. 3, 4 and 5 of the drawing illustrate by way of one example how the invention may also be embodied in the leading edge portion of an airfoil component of a spacecraft or the like. Hereagain, in the case of a spaceship during reentry, or the like, the leading edge portions of the airfoils of such craft are subjected to the excessive friction induced heat accommodating problem referred to hereinabove. In FIGS. 3, 4 and 5, the airfoil leading edge portion 16 is shown as being of the dual skin "honeycomb" type. The outer skin component is designated 49, while the inner skin component is designated 52 and an end wall 53 completes the assembly. The skin members are parallel spaced apart and relatively braced by means of web components 54 in the manner of a honeycomb-like structure comprising a multiplicity of relatively small heat exchange compartments 56. The inner skin 52 is formed as shown at FIG. 3 with coolant inlet ports 58, and coolant outlet ports 59 at opposite corners of each of the heat exchange compartments 56. The coolant inlets are supplied by means of a conduit 60 and the spent coolant discharges are passed through a return conduit 62 to a refrigeration or the like facility. However, it is to be understood that the compartments 56 may be of any other polygonal plan view shapes such as triangular, trapezoidal, etc., in order to conform to the contours of various surface areas of the craft.

Thus, it will be appreciated that the airfoil constructions of FIGS. 3, 4 and 5 feature means for individually flushing each heat exchange compartment 56 with freshly rejuvenated coolant against the inner surface of its portion of the outer skin member 49, and from thence prompt return through the conduit 62 to the coolant retreating facility, in accordance with the objects of this invention as explained hereinabove.

FIGS. 7, 8 and 9 correspond to FIGS. 3, 4 and 5, but illustrate embodiments of the invention in another form of airfoil leading edge construction. In this case, three spaced apart skin components 70, 72 and 74 are employed to convey fresh coolant fluid into a multiplicity of small heat exchange compartments 77 behind the outer skin member 70, and to promptly gather and return the spent coolant to the rejuvenation facility. Coolant inlet tunnels 78 interconnect the manifold section 80 to the coolant supply conduit 60, and outlet tunnels 82 interconnect the manifold 80 with the coolant return conduit 62. Furthermore, with a view to economizing the coolant rejuvenating operation, multiple coolant supply conduits may be arranged to conduct cooling fluids at only successively higher temperatures to banks of compartments located successively behind the leading edge portion of each airfoil.

However, in order to fully acquire the advantages of the superior heat exchange systems hereinabove described and illustrated in conjunction with nose cone, leading edges of airfoils, and side, top and bottom panel components of such ships, unique coolant supply and return to rehabilitation facilities must be employed in combination therewith. As shown by way of example at FIG. 2, a nose cone skin structure comprising three parallel spaced apart skin members may be efficaciously serviced by a pair of fresh coolant supply conduits which lead into opposite ends of a manifold system 35 whereby delivery of coolant under substantially uniform pressure and at substantially the lowest available temperature into each of the heat exchange compartments 23 behind the outer skin 20 is assured. In combination therewith, the plenum 40 receives the spent coolant from each compartment 23 and leads it into the conduit 44 for rejuvenation as explained hereinabove.

Figure 11:
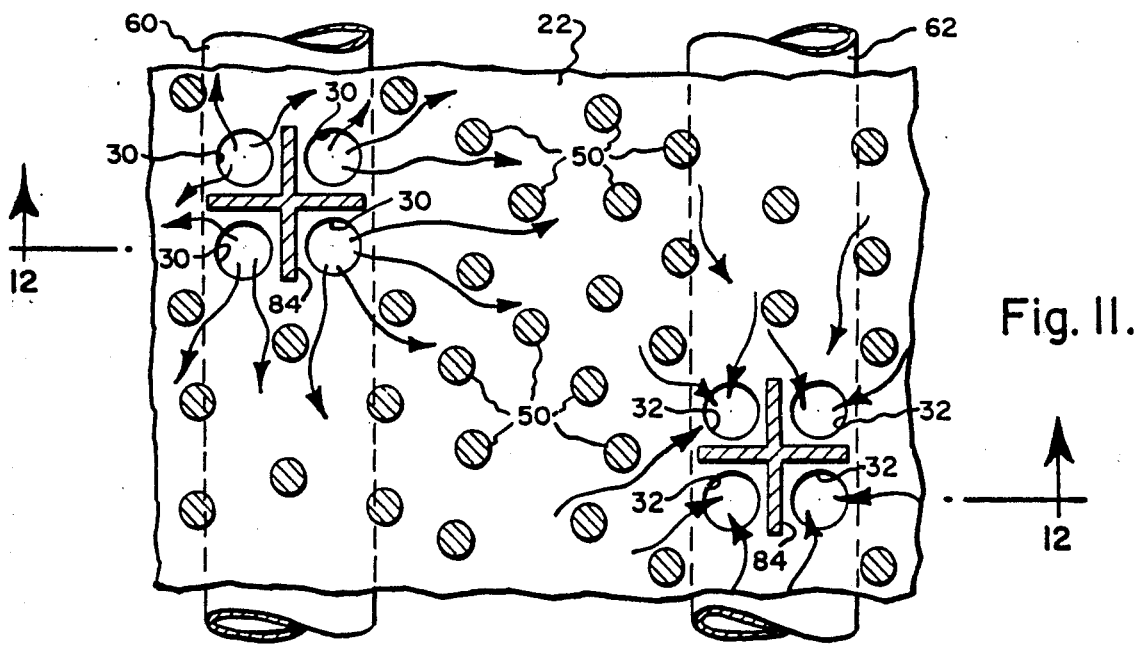
FIG. 11 is a view corresponding to FIG. 6 but showing a modified multiple skin support web and coolant flow pattern control arrangement.

Further by way of examples as shown at FIGS. 3, 4 and 5 and at FIGS. 7, 8 and 9, the coolant supply manifold and coolant return plenum arrangements ensure supply of coolant at the prescribed temperature and under uniform pressures into the heat exchange compartments of dual skin and triple skin airfoil leading edge constructions, respectively. FIG. 11 corresponds to FIG. 6, but shows how the skin separating webs may be discontinuous between the cross points 46 so as to leave only cruciform shaped skin separating webs as are designated generally by the numeral 84 and having radially extending blade portions 86. Although the skin separating webs are shown as being discontinuous, the arrangement of blade portions 86 nonetheless serves to divide the space between the inner and outer skins into functionally separate compartments each having inlet and outlet apertures arranged at opposite corners thereof. In this case, the coolant is enabled to flow more freely, while at the same time assuming a multiplicity of short length cavitation-like flow patterns against the inside surface of the outer skin of the craft. Note that in this case the coolant supply and return apertures through the backup skin member are nested between the blades 86 and at the base of each web member 84, whereby the web members are constantly flushed with both fresh and spent coolant. Thus, the possibility of the generation of "hot spots" in the outer skin is avoided, such as might otherwise occur in event of blockages of coolant flow through any one or more of the inlet apertures 30. FIGS. 6, 10, 11 and 12 illustrate how the skin bracing posts 50 act to scatter the coolant flow patterns within the heat exchange cavitations over the entire inside surfaces of the outer skin member, while at the same time providing structural support between the outer and inner skins and thereby permitting high fluid flow velocities which yield high heat transfer coefficients without excessive pressure drops.

Whereas the constructions heretofore shown and described have been related to the nose cap and airfoil components of the craft, it is to be understood that they are also equally applicable to any relatively flat top or bottom or side panel portion of the craft (such as shown at 18, FIG. 1) which may be subject to excessive air friction induced heating during operation of the craft. They may also be employed to advantage in the leading edge construction of the craft's engine air intake cooling(s) and to the duct system leading therefrom to the engine(s). Also, it will be appreciated that the invention is equally applicable to any other type high speed operating spacecraft or aircraft heretofore referred to for the purpose of reducing the craft's heat signature and preserving the structural integrities of those surfaces of the craft which are exposed to air friction-inducing excessively high temperatures during high speed operations of the craft.

I claim:

1. An atmospheric flight operating craft having an external skin structural portion which is subject to air friction-induced overheating during high speed operations of said craft, and a fluid coolant supply and spent coolant return and rejuvenation means carried within said craft, said skin portion comprising:
    an outer skin member and a backup skin member facing said outer skin member, and web members integrated therewith and separating said skin members, said web members intersecting to define pluralities of relatively small functionally separated compartments extending between facing surfaces of said skin members;
    said backup skin member being apertured to define coolant supply and coolant return apertures in registry with oppositely located portions of each of said compartments and coupled thereat in fluid flow communication with said coolant supply and said coolant return means, respectively.

2. An atmospheric flight operating craft as set forth in claim 1 wherein said compartments are in plan view of polygonal bucket-like form and said oppositely located portions are diagonally opposite corner portions of each of said compartments.

3. An atmospheric flight operating craft as set forth in claim 2 wherein combination baffle and support posts are disposed in said compartments and structurally integrated with said outer skin member and said backup skin member thereby reinforcing said skin members and dispersing the flow of coolant throughout the areas of said compartments.

4. An atmospheric flight operating craft as set forth in claim 3 wherein said coolant supply and said coolant return means are each of manifold type having branches thereof leading directly and separately to and from, respectively, said inlet and outlet apertures through said backup skin member.

5. An atmospheric flight operating craft as set forth in claim 2 wherein said coolant supply and said coolant return means are each of manifold type having branches thereof leading directly and separately to and from, respectively, said inlet and outlet apertures through said backup skin member.

6. An atmospheric flight operating craft as set forth in claim 1 wherein said web members are discontinuous and define separating webs of cruciform plan view configuration comprising a plurality of radially extending blade members and said separating webs are located at said oppositely located portions of each said compartment and said coolant supply and coolant return apertures are nested between said blade members.

7. An atmospheric flight operating craft as set forth in claim 6 wherein combination baffle and support posts are disposed in said compartments and structurally integrated with said outer skin member and said backup skin member thereby reinforcing said skin members and dispersing the flow of coolant throughout the areas of said compartments.

8. An atmospheric flight operating craft as set forth in claim 7 wherein said coolant supply and said coolant return means are each of manifold type having branches thereof leading directly and separately to and from, respectively, said inlet and outlet apertures through said backup skin member.

9. An atmospheric flight operating craft as set forth in claim 6 wherein said coolant supply and said coolant return means are each of manifold type having branches thereof leading directly and separately to and from, respectively, said inlet and outlet apertures through said backup skin member.

10. An atmospheric flight operating craft as set forth in claim 1 wherein combination baffle and support posts are disposed in said compartments and structurally integrated with said outer skin member and said backup skin member thereby reinforcing said skin members and dispersing the flow of coolant throughout said compartments.

11. An atmospheric flight operating craft as set forth in claim 10 wherein said coolant supply and said coolant return means are each of manifold type having branches thereof leading directly and separately to and from, respectively, said inlet and outlet apertures through said backup skin member.

12. An atmospheric flight operating craft as set forth in claim 1 wherein said coolant supply and said coolant return means are each of manifold type having branches thereof leading directly and separately to and from, respectively, said inlet and said outlet apertures through said backup skin member.

13. An atmospheric flight operating craft as set forth in claim 1, wherein an additional backup skin member is disposed adjacent said backup skin member and defines therewith a manifold connected to one of said coolant supply and coolant return apertures of each of said compartments, and inner skin is disposed adjacent said additional backup skin and defines therewith an other manifold, one of said manifolds being connected to one of said coolant supply and coolant return means and the other of said manifolds being connected to the other of said coolant supply and coolant return means, and said other manifold is connected to the other of said coolant supply and coolant return apertures of each of said compartments by conduits extending through said manifold and connecting said additional backup skin member to said backup skin member.

* * * * *